Feb. 16, 1960 F. G. BROCKARDT ET AL 2,924,996
GEAR MECHANISM FOR FEEDING LATHE TAILSTOCK SCREW
Filed June 22, 1956
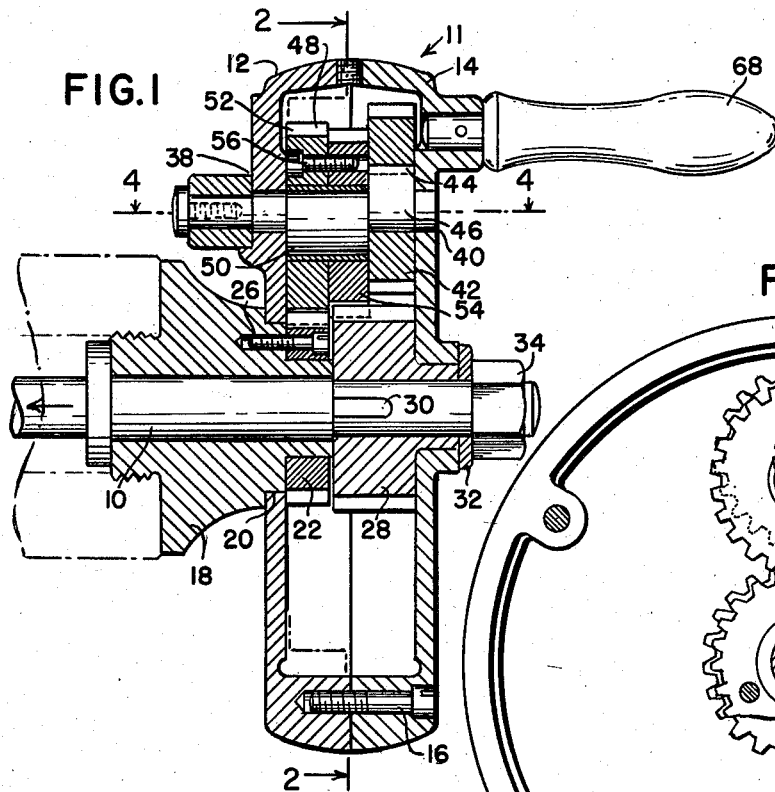
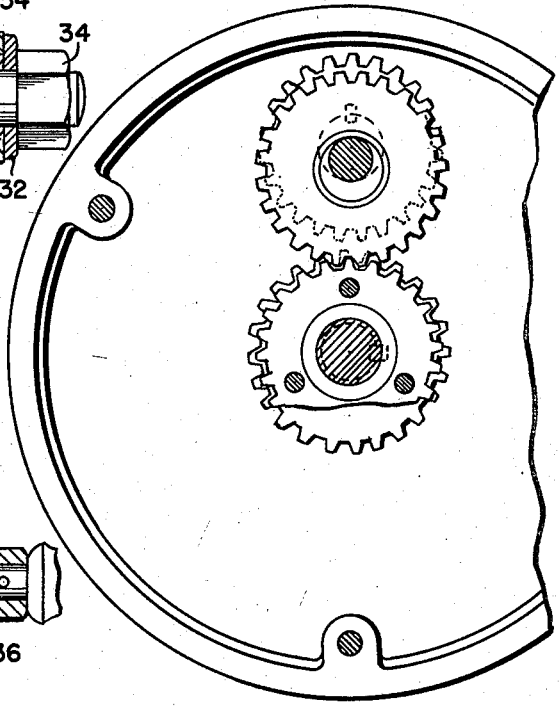
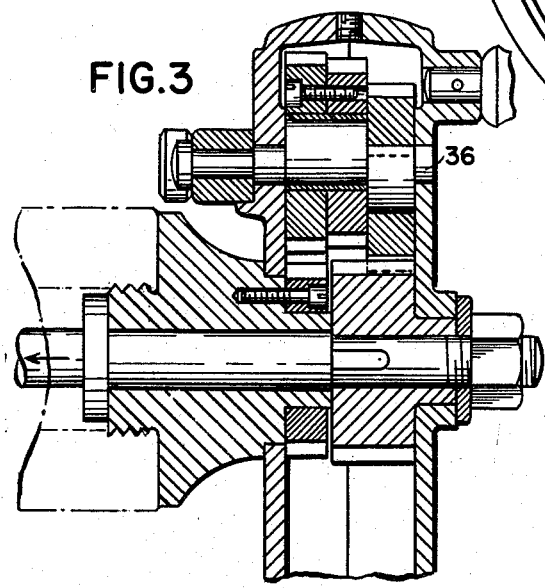
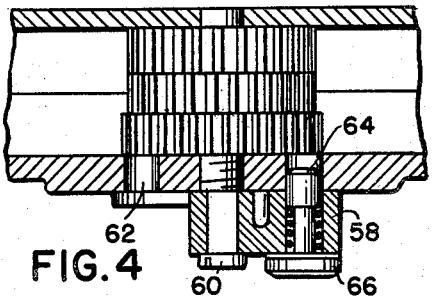
INVENTORS
Frank G. Brockardt
Joseph H. Koch
by Eyre, Mann & Burrows
ATTORNEYS

2,924,996

GEAR MECHANISM FOR FEEDING LATHE TAILSTOCK SCREW

Frank G. Brockardt and Joseph H. Koch, Wheeling, W. Va., assignors to Bethlehem Gear and Machine Co., a corporation of West Virginia Application June 22, 1956, Serial No. 593,168

2 Claims. (Cl. 74—750)

This invention relates to a gear mechanism for feeding the tailstock screw of a lathe.

The structure of the present invention includes a housing which is so geared to the tailstock screw of a lathe that when the housing is rotated it feeds the tailstock screw toward the headstock of the lathe. The gears provide direct as well as indirect drive for feeding the tailstock screw and either may be selected depending upon the requirements of the job at hand. For ordinary jobs, direct drive is used but where a powerful driving force is required as in drilling operations, indirect drive is preferred. Indirect drive is achieved through a planetary gear system which gives a slow feed with tremendous power. One advantage of the gear mechanism of the present invention is the ease with which the gears are shifted by means of a gear shift lever to obtain direct or indirect drive and another advantage is that the planetary gear train of the indirect drive is so powerful that it is possible to hand feed a drill up to two or more inches in diameter without first drilling a lead hole in the stock.

These and other advantages of the present invention may be readily understood by reference to the accompanying drawings in which Fig. 1 is a sectional plan view of the gear mechanism of the present invention with the gears set for indirect drive;

Fig. 2 is a sectional view taken on line 2—2 of Fig. 1;

Fig. 3 is a sectional plan view as in Fig. 1 with the gears set for direct drive; and Fig. 4 is taken on line 4—4 of Fig. 1.

Referring to the drawings, the gear mechanism of the present invention for driving the tailstock screw 10 of a lathe (not shown) includes a housing 11 made up of a front casing 12 and a rear casing 14 which are bolted together as at 16. Housing 11 is rotatively mounted on the tailstock screw bearing 18 of the lathe by means of a suitable bearing 20. A gear 22 is mounted on the tailstock screw bearing 18 and held in a fixed position by means of a screw 26 so that the gear will not rotate. This gear 22 as later described is part of a planetary gear system which is used for indirect drive. A second gear 28 is mounted on the lathe tailstock screw and this gear is the driving gear for the lathe tailstock screw and it is keyed to the screw at 30. A washer 32 and nut 34 hold the housing and gear in position on the lathe tailstock screw.

The remainder of the gear train for driving the lathe tailstock screw is mounted on an eccentric shaft 36 which is rotatively mounted in housing 11 in suitable bearings 38 and 40 respectively. Shaft 36 is mounted a predetermined distance away from the lathe tailstock screw 10 and the longitudinal axis of shaft 36 is positioned parallel to the longitudinal axis of the lathe tailstock screw. Shaft 36 carries a gear 42 keyed at 44 to eccentric bearing 46 of shaft 36 and the teeth of this gear are adapted to mesh with the tailstock screw driving gear 28. Shaft 36 also carries a planetary gear 48 rotatively mounted on eccentric bearing 50 of shaft 36. Planetary gear 48 is a composite of two gears. One of the gears 52 is adapted to mesh with gear 22 and the second gear 54 is adapted to mesh with the tailstock screw driving gear 28. Gears 52 and 54 are united by means of a screw 56 to form the composite planetary gear 48. The eccentric bearing 46 of shaft 36 and the eccentric bearing 50 are positioned 180° apart an opposite sides of shaft 36 and as a result rotation of eccentric shaft 36 through 180° will change the gear train in housing 11. When eccentric bearing 50 is down (Fig. 1), the composite planetary gear 48 will engage gear 22 as well as gear 28 and at the same time eccentric bearing 46 will be up and gear 42 will be disengaged from gear 28. When eccentric bearing 46 is down, gear 42 will engage gear 28 but eccentric bearing 50 will be up and gear 48 will be disengaged from gears 22 and 28 (Fig. 3). Shaft 36 is readily rotated about its longitudinal axis to shift gears by means of a gear shift lever 58 which is held in position on the shaft with a screw 60. Two holes 62 and 64 are each positioned in housing 11 on opposite sides of shaft 36 and the holes are adapted to receive a spring loaded plunger 66 of gear shift lever 58 so that shaft 36 will be held in a set position against rotation about its longitudinal axis when either gear 42 or 48 is engaged with one or more of the gears 22 or 28.

In operation the gears are set in the desired position and then housing 11 is rotated by means of a suitable handle 68 so that the longitudinal axis of shaft 36 moves in a circle about the longitudinal axis of the lathe tailstock screw 10. As a result the tailstock screw is caused to rotate and feed in the direction of the arrow toward the headstock of the lathe. If direct drive is desired, gear 42 is brought into engagement with gear 28 (Fig. 3) by rotating gear shift lever 58 to bring the spring loaded plunger 66 into position in hole 62 of housing 11. Since gear 42 is keyed to shaft 36 it can not rotate about the longitudinal axis of the shaft and as a result it causes gear 28 to rotate when the longitudinal axis of shaft 36 is moved in a circle around the longitudinal axis of the lathe tailstock screw. Since gear 28 is also keyed to the lathe tailstock screw it forces the screw to rotate and feed in the direction of the arrow of Fig. 3. For indirect drive, the composite planetary gear 48 is brought into engagement with gears 22 and 28 (Fig. 1) by rotating gear shift lever 58 through 180° to position spring loaded plunger 66 in hole 64 of housing 11. This brings gear 52 of the composite planetary gear into engagement with gear 22 and gear 54 into engagement with gear 28. When housing 11 is rotated stationary gear 22 causes gears 52 and 54 to rotate and gear 54 in turn rotates gear 28 to rotate lathe tailstock screw 10 and cause it to feed in the direction of the arrow of Fig. 1. In this connection it is advisable to key or otherwise secure the lathe tailstock screw bearing 18 to the lathe tailstock so that the bearing will resist rotation caused by the torque of gear 22. In this connection it will be noted that the gearing in housing 11 is so arranged that rotation of the housing in a single direction will result in feeding the lathetailstock screw in a single direction for both direct and indirect drive.

The number of teeth in the gears may be varied as desired and excellent results have been achieved with 34 teeth in gears 22, 42, and 54, and 35 teeth in gears 28 and 52. With this construction when the mechanism is set for indirect drive it takes 17.5 revolutions of housing 11 for each revolution of tailstock screw 10 and in direct drive it takes one revolution for each revolution of the tailstock screw.

The lathe and its tailstock are not shown as these are standard units made in conventional manner and they do not constitute part of the present invention.

It will be understood that it is intended to cover all changes and modifications of the preferred embodiment of the invention herein chosen for the purpose of illustration which do not constitute departures from the spirit and scope of the invention.

What we claim is:

1. An integral gear mechanism adapted to be mounted on the tailstock screw bearing of a lathe to replace the usual handwheel whereby the suport member of the tailstock of the lathe may be fed longitudinally along the axis of the tailstock of the lathe when the gear mechanism is rotated manually by hand comprising a housing rotatively mounted on the bearing of the tailstock of the lathe which bearing rotatively supports the tailstock screw, said housing including a driving gear keyed to the tailstock screw of the lathe, a shaft rotatively mounted in said housing and spaced a predetermined distance away from the periphery of said driving gear, said shaft having two excentric bearing surfaces positioned adjacent one another on the shaft within the confines of the housing with the excentric portion of each bearing surface being arranged on opposite sides of the shaft in position approximately 180° apart, a second gear member mounted in fixed position on one of said excentric bearing surfaces to turn therewith, said excentric bearing surface being adapted to move the second gear member towards and away from the said driving gear as the shaft rotates to rotate said second gear to cause it to engage and disengage the driving gear on the lathe tailstock screw, a composite planetary gear rotatably mounted on the second one of said excentric bearing surfaces, said second excentric bearing surface being adapted to move the said composite gear towards and away from the said driving gear as the shaft rotates to cause said composite gear to engage and disengage the driving gear on the lathe tailstock screw, means for rotating the shaft to cause one of the two gears mounted thereon to move towards the driving gear to enter into meshed engagement with the said driving gear while the second one of the said two gears on said shaft is disengaged and moved away from the said driving gear, a third gear mounted in a fixed position within the housing on the bearing for the lathe tailstock screw, said third gear being adapted to mesh with the composite planetary gear when the planetary gear is in engagement with said driving gear on the lathe tailstock screw whereby when the housing is manually rotated by hand the tailstock screw may be driven in direct drive with the second gear and in indirect drive with the planetary gear to feed the support member of the tailstock toward or away from the headstock of the lathe, said means for rotating the shaft comprising a gear shift lever which is mounted at one end in fixed position on such shaft outside the housing, a hole in the housing positioned opposite the second end of said lever when one of the two gears carried by said shaft is in meshed engagement with said driving gear, a second hole in the housing positioned opposite the second end of said lever when the other one of the two gears carried by the shaft is in meshed engagement with the said driving gear, a reciprocable pin mounted on the second end of said gear shift lever which is adapted to fit into the said holes in position therein with the side wall of the pin in contact with the interior side wall of the hole in the housing whereby the said shaft may be rotated by said gear shift lever to cause one of said gears carried by the shaft to be brought into meshed engagement with the said driving gear and the lever locked in position to hold said gear on the shaft in meshed engagement with the said driving gear by inserting the reciprocable pin into one of said holes so that the force generated to separate the meshed gears and rotate the shaft will be applied as a shearing action against the side wall of the pin of the gear shift lever.

2. In an integral gear mechanism of the type adapted to be mounted on the tailstock screw bearing of a lathe to replace the usual handwheel whereby the suport member of the tailstock of the lathe may be fed longitudinally along the axis of the tailstock of the lathe when the gear mechanism is rotated manually by hand which gear mechanism includes a housing rotatably mounted on the bearing of the tailstock screw of the lathe and which housing includes a driving gear keyed to the tailstock screw of the lathe and a second stationary gear mounted in fixed position on the lathe tailstock within the said housing, the combination which comprises a shaft rotatably mounted in said housing and spaced a predetermined distance away from the periphery of said driving gear and said second stationary gear, said shaft having two adjacent excentric bearing surfaces positioned thereon within the confines of the housing with the excentric portion of each bearing surface being arranged at opposite sides of the shaft in position approximately 180° apart, a third gear member mounted in fixed position on one of said excentric bearing surfaces to rotate therewith, said excentric bearing surface being adapted to move the third gear member towards and away from the said driving gear as the shaft is rotated and to rotate such third gear as it moves toward and away from the said driving gear to cause said third gear to engage and disengage the driving gear of the lathe tailstock screw, a composite planetary gear rotatably mounted on the second one of said excentric bearing surfaces, said second bearing surface being adapted to move the composite gear towards and away from both the said driving gear and stationary gear to cause said composite gear to engage and disengage both the driving gear and the second stationary gear, a gear shift lever mounted at one end of the shaft outside the said housing for rotating the shaft in one direction to cause the said composite gear to enter into meshed engagement with said driving gear on the lathe tailstock screw while the said third gear is disengaged from the said driving gear, said lever being adapted to rotate the shaft in a second direction to cause the said third gear to enter into meshed engagement with the driving gear on the lathe tailstock screw while the composite gear is disengaged from the said driving gear in the housing, a pin mounted on the second end of said arm and locking means carried by the housing adapted to receive said pin and rigidly contact the side wall thereof in a non-yielding relationship to hold the pin in locked engagement when either one of the said gears on the shaft are in meshed engagement with the said driving gear so that forces tending to separate the gears from meshed engagement will be applied in a shearing action against the side wall of the pin whereby when the housing is manually rotated by hand the tailstock screw may be driven in direct drive with the second gear and in indirect drive with the planetary gear to feed the tailstock screw towards and away from the head of the lathe.

References Cited in the file of this patent
UNITED STATES PATENTS

| 437,068 | Whiton | Sept. 23, 1890 |
| 767,312 | Otis | Aug. 9, 1904 |
| 1,676,441 | Jackson | July 10, 1928 |
| 2,640,375 | Trofimov | June 2, 1953 |
| 2,713,274 | Lockwood | July 19, 1955 |
| 2,770,326 | Wayman | Nov. 13, 1956 |

FOREIGN PATENTS

| 168,785 | Great Britain | Sept. 15, 1921 |
| 62,939 | France | Feb. 23, 1955 |
| | (1st addition to 1,038,536) | |